united States Patent [19]
Ueno et al.

[11] 4,370,387
[45] Jan. 25, 1983

[54] PRE-COATED STEEL SHEETS AND PROCESS FOR PRODUCTION THEREOF

[75] Inventors: Nagaharu Ueno; Joji Oka; Hidejiro Asano, all of Tokyo; Takahisa Ogasawara, Tokai; Kiyokazu Mizutani, Inagawa; Yoshiitsu Tominaga, Tokyo, all of Japan

[73] Assignees: Toagosei Chemical Industry Co., Ltd.; Nippon Steel Corporation, both of Tokyo, Japan

[21] Appl. No.: 245,307

[22] Filed: Mar. 19, 1981

[30] Foreign Application Priority Data

Mar. 19, 1980 [JP] Japan .................................. 55-33891

[51] Int. Cl.³ ................................................ B32B 9/06
[52] U.S. Cl. ................................. 428/458; 204/159.19; 427/44
[58] Field of Search ................... 427/44; 204/159.19; 428/458

[56] References Cited

U.S. PATENT DOCUMENTS

| 3,367,992 | 2/1968 | Bearden | 526/320 |
| 3,455,801 | 7/1969 | D'Alelio | 204/159.19 |
| 3,455,802 | 7/1969 | D'Alelio | 204/159.19 |
| 3,485,732 | 12/1969 | D'Alelio | 204/159.19 |
| 3,485,733 | 12/1969 | D'Alelio | 204/159.19 |
| 4,137,138 | 1/1979 | Batt et al. | 427/44 |

FOREIGN PATENT DOCUMENTS

| 48-36956 | 11/1973 | Japan . |
| 52-22995 | 6/1977 | Japan . |
| 52-25438 | 7/1977 | Japan . |
| 52-30035 | 8/1977 | Japan . |
| 53-49027 | 5/1978 | Japan . |
| 53-139692 | 12/1978 | Japan . |
| 53-147024 | 12/1978 | Japan . |
| 54-30431 | 10/1979 | Japan . |
| 55-65224 | 5/1980 | Japan . |

Primary Examiner—George F. Lesmes
Assistant Examiner—E. Rollins Buffalow
Attorney, Agent, or Firm—Sughrue, Mion, Zinn, Macpeak and Seas

[57] ABSTRACT

A precoated steel sheet and a process for production thereof is provided which comprises coating a resin composition comprising mainly an acryloxyloxy- or methacryloyloxy-terminated polyester on the surface of a steel sheet, said acryloyloxy- or methacryloyloxy-terminated polyester being prepared by reacting a hydroxy-terminated polyester comprising (a) a dicarboxylic acid unit containing about 10 to about 80 mol % of a terephthalic acid unit and (b) dihydric alcohol unit containing about 30 mol % or more of a dihydric alcohol unit containing 3 or more carbon atoms, and having a number average molecular weight of about 400 to about 5,000, with acrylic acid or methacrylic acid, and curing the thus-coated resin composition by irradiating the sheet with an electron beam.

18 Claims, No Drawings

PRE-COATED STEEL SHEETS AND PROCESS FOR PRODUCTION THEREOF

FIELD OF THE INVENTION

This invention relates to a pre-coated steel sheet and a process for producing such a sheet by coating a resin composition comprising mainly an acryloyloxy- or methacryloyloxy-terminated polyester and curing with an electron beam.

BACKGROUND OF THE INVENTION

The terms "acrylic acid," "acrylate", and "acryloyloxy" are used hereinafter in this specification to mean both acrylic acid and methacrylic acid, acrylate and methacrylate, and acryloyloxy and methacryloyloxy, respectively.

Recently, a method of curing coated films or printed images by irradiating with an electron beam has been put into practical use. Paints and inks which can be cured by this method are made from polymerizable compounds composed mainly of radical-polymerizable compounds which are prepared by appropriately combining prepolymers, oligomers, and monomers, all containing therein polymerizable unsaturated groups.

In comparison with more conventional heat-curing or ultraviolet ray-curing method, the cure time required in the electron beam-curing method, particularly with respect to productivity and resin characteristics, is usually within a second, so that the coated film layer or printed ink layer is subject to abrupt shrinkage in the course of curing thereof. As a result, the residual strain of the layer is severely increased because it is cured in a very short period of time, and thus the adhesive properties of paints or inks to substrates tend to be deteriorated in electron beam-curing method.

This tendency is particularly significant when a steel sheet is used as a substrate, unlike a paper or plastic substrate wherein the absorption phenomenon of paint or resin into the substrate and the graft reaction can be expected.

In order to eliminate the foregoing defects, various methods have been proposed, but no satisfactory methods have been discovered.

These methods can be divided into a group in which the resin structure and composition are intended to be improved and a group in which the irradiation process is intended to be improved.

Examples of methods falling in the former group include a method wherein compounds capable of reacting with a metal surface (e.g., a silane coupling agent, a titanate coupling agent, an epoxidized compound, and a polyisocyanate compound) are incorporated, a method wherein a phosphoric acid ester group and a carboxy group are compounded or introduced into the molecular skeleton of the resin, a method wherein a surfactant is incorporated, and a method wherein in order to reduce the shrinkage in the course of curing, a thermoplastic polymer is added.

Examples of methods falling in the latter group include a method wherein painting or printing is performed while heating the substrate, a method wherein after the irradiation, heating is applied to release the strain, and a method wherein multi-stage irradiation is applied to release the strain.

A large number of acryloyloxy-terminated polyesters wherein the polybasic acid unit and the polyhydric alcohol unit constituting the polyester portion are varied are known in the art. For example, polyester acrylates having an aliphatic polyester skeleton are described in U.S. Pat. Nos. 3,455,801, 3,455,802, 3,485,732 and 3,485,733, and polyester acrylates containing an aromatic dibasic acid unit are described in Japanese patent application (OPI) Nos. 1322/71, 883/73 and 134745/74 (the term "OPI" as used herein refers to a "published unexamined Japanese patent application") and Japanese patent publication Nos. 22164/73 and 8264/73.

Japanese patent publication No. 22164/73 and Japanese patent application (OPI) No. 134745/74 disclose terephthalic acid, isophthalic acid and a dicarboxylic acid having 4 or more carbon atoms as a starting material for production of polyester acrylates, but do not describe polyester acrylates as used in this invention, and include no disclosure of using the polyester acrylates on steel sheet.

The use of terephthalic acid, isophthalic acid and a saturated dicarboxylic acid having 4 or more carbon atoms as a starting material for polyester acrylates are also disclosed in Japanese patent publication Nos. 36956/73, 22995/77, 25438/77, 30431/79 and 30035/76 and Japanese patent application (OPI) Nos. 49027/78, 139692/78, 147024/78 and 65224/80.

Additionally, crystalline acryloyloxy-terminated polyesters having a polyester portion made from terephthalic acid and ethylene glycol are known. These crystalline acryloyloxy-terminated polyesters, however, cannot be used as materials for liquid paints or inks, since they have high melting points and are almost insoluble in generally used monomers, oligomers or solvents.

Furthermore, a number of polymerizable acrylates, such as acryloyloxy-terminated polyurethane (urethane acrylate) and acryloyloxy-terminated epoxy ester (epoxy acrylate), are known. It is also known that such polymerizable acrylates can be used as paints or inks which are to be cured by irradiation with ultraviolet rays or electron beams, or by heating. However, paints and inks prepared using such polymerizable acrylates are not sufficient in the adhesion to a steel sheet, such as a zinc electrogalvanized steel sheet, a zinc galvanized steel sheet, and a cold-rolled steel sheet, a chemically-treated steel sheet, a tin plate, a tin-free steel (TFS) sheet, etc. Furthermore, their performance is insufficient in applications where forming is performed after the painting or printing. Thus, these paints and inks are subject to limitations in thier applications.

SUMMARY OF THE INVENTION

This invention relates to a process for the production of pre-coated or pre-printed steel sheets having adhesive properties, particularly comprising coating a specific polyester oligomer on a steel sheet and irradiating the coated sheet with an electron beam.

As a result of extensive investigations to overcome the problems in the prior art described above and to provide a polymerizable acrylate which can be directly coated or printed on a steel sheet, particularly a tin-free steel sheet and a tin plate, to which conventional paints or inks of the type curable with an electron beam could not be bonded, and furthermore which exhibits excellent performance in applications where post-formability is required, the present invention has now been made.

Therefore, in accordance with this invention, a pre-coated steel sheet and process for production thereof is provided which comprises coating a resin composition comprising mainly an acryloyloxy- or methacryloyloxy-terminated polyester on the surface of a steel sheet, said acryloyloxy- or methacryloyloxy-terminated polyester being prepared by reacting a hydroxy-terminated polyester comprising (a) a dicarboxylic acid unit containing about 10 to about 80 mol% of a terephthalic acid unit and (b) dihydric alcohol unit containing about 30 mol% or more of a dihydric alcohol unit containing 3 or more carbon atoms, and having a number average molecular weight of about 400 to about 5,000, with acrylic acid or methacrylic acid, and curing the thus-coated resin composition by irradiating the sheet with an electron beam.

DETAILED DESCRIPTION OF THE INVENTION

The acryloyloxy-terminated polyester of this invention can be prepared by reacting a hydroxy-terminated polyester with a specific structure with acrylic acid to convert the hydroxy group into an acrylate.

The hydroxy-terminated polyester as used herein comprises:

(1) a dicarboxylic acid unit containing about 10 to about 80 mol% of a terephthalic acid unit and a dihydric alcohol unit containing about 30 mol% or more of a dihydric alcohol unit containing 3 or more carbon atoms;

(2) preferably, a dicarboxylic acid unit comprising about 10 to about 80 mol% of a terephthalic acid unit, about 10 to about 80 mol% of an isophthalic acid and/or a saturated dicarboxylic acid unit containing 4 or more carbon atoms (including the carbon atoms in the carboxyl groups thereof), and 0 to about 50 mol% of another dicarboxylic acid unit, and a dihydric alcohol unit containing about 30 mol% or more of a dihydric alcohol unit containing 3 or more carbon atoms; and (3) more preferably, a dicarboxylic acid unit comprising about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit wherein the molar ratio of the isophthalic acid unit to the terephthalic acid unit is from about 0.3:1 to about 3:1 and the molar ratio of the saturated dicarboxylic acid unit containing 4 or more carbon atoms to the total amount of the terephthalic acid unit and the isophthalic acid unit is from about 1/9:1 to about 1:1, and a dihydric alcohol unit containing about 30 mol% or more of a dihydric alcohol unit containing 3 or more carbon atoms.

The molecular weight of each of these hydroxy-terminated polyesters (all molecular weights as used in this specification are number average molecular weight) is from about 400 to about 5,000 and preferably is from about 500 to about 2,000. When the molecular weight is too small, the acryloyloxy-terminated polyester obtained provides a cured product having low flexibility and low adhesion to a substrate, whereas when the molecular weight is too large, the acryloyloxy-terminated polyester obtained has an extremely high viscosity or is solid and its curing rate is lowered.

In order to permit the acryloyloxy-terminated polyester to exhibit good adhesion when it is applied to steel sheet and cured by irradiation with an electron beam, the viscosity of the acryloyloxy-terminated polyester is adjusted to at least about 100 cps, and preferably to at least about 500 cps.

Of those units forming the polyester, the terephthalic acid unit most greatly contributes to the characteristics of the acryloyloxy-terminated polyester and the physical properties of the cured product. When the proportion of the terephthalic acid unit is too large, the acryloyloxy-terminated polyester obtained is in a crystalline form and is not compatible with other monomers or oligomers and, therefore, it cannot be used as a material for a non-solvent type of paint or ink. Additionally, the cured coating film is subject to whitening and a transparent and uniform coating cannot be obtained. On the other hand, when the proportion of the terephthalic acid unit is too small, the polyester obtained provides a cured product having lowered strength, elongation, flexibility, hardness, chemical resistance and adhesion to a substrate. Therefore, the terephthalic acid unit constitutes about 10 to about 80 mol% of the dicarboxylic acid unit.

Similarly, the dihydric alcohol unit is an important factor affecting the characteristics of the acryloyloxy-terminated polyester and the physical properties of the cured product. When the unit of ethylene glycol (number of carbon atoms: 2), which is believed to provide a high molecular weight saturated polyester having the best physical properties, is present in an excessive amount, the acryloyloxy-terminated polyester is not liquid, but is a solid in a crystalline form and, furthermore, the compatibility of the acryloyloxy-terminated polyester with other oligomers or monomers is lowered. Therefore, the dihydric alcohol unit containing 3 or more carbon atoms, preferably up to 100 carbon atoms, constitutes about 30 mol% or more of the dihydric alcohol unit and it is more desirable that it constitutes about 50 mol% or more of the dihydric alcohol unit.

Another factor affecting the characteristics of the acryloyloxy-terminated polyester and the physical properties of the cured product is the other dicarboxylic acid units which are used in combination with the terephthalic acid unit. The most suitable dicarboxylic acid units to be used in combination with the terephthalic acid units are an isophthalic acid unit and a saturated dicarboxylic acid unit containing 4 or more carbon atoms.

The isophthalic acid unit compensates for decreases in the strength, hardness, chemical resistance and adhesion to a substrate of the cured product resulting from a decrease in the terephthalic acid unit content, permits a liquid acryloyloxy-terminated polyester to be obtained and increases the compatibility of the acryloyloxy-terminated polyester with other monomers and oligomers. The saturated dicarboxylic acid unit containing 4 or more carbon atoms contributes to the formation of a liquid acryloyloxy-terminated polyester, an increase in the compatibility with other oligomers and monomers, and furthermore to the formation of a cured product having good elongation and flexibility.

Introduction of the isophthalic acid unit or dicarboxylic acid unit containing 4 or more carbon atoms is useful in that acryloyloxy-terminated polyesters having various characteristics can be produced and the performance of the cured product is changed. For this reason, it is more desirable for both the isophthalic acid unit and the saturated dicarboxylic acid unit containing 4 or more carbon atoms to be introduced. It is desirable for the isophthalic acid unit and/or the saturated dicarboxylic acid unit containing 4 or more carbon atoms to constitute about 10 to about 80 mol% of the dicarboxylic acid unit in order to utilize the inherent characteristics of the terephthalic acid unit which is an essential dicarboxylic acid unit.

Other dicarboxylic acid units (e.g., a maleic acid unit, a fumaric acid unit, a phthalic acid unit, etc.) do not exert any great influence on the characteristics of the acryloyloxy-terminated polyester obtained and the physical properties of the cured product; are so to speak inert dicarboxylic acid units and, in some cases, exert slightly adverse influences on some of the physical properties of the cured product, such as strength, elongation, chemical resistance, weather resistance and flexibility. Therefore, there are no special reasons to incorporate these units, but they can be introduced for the purpose of decreasing the cost of the acryloyloxy-terminated polyester, if desired. In this case, it is desirable to incorporate them in an amount of about 50 mol% or less of the dicarboxylic acid unit.

Where the dicarboxylic acid unit consists of the terephthalic acid unit, the isophthalic acid unit and the saturated dicarboxylic acid unit containing 4 or more carbon atoms, it is particularly preferred for the molar ratio of the isophthalic acid unit to the terephthalic acid unit to be about 0.3:1 to about 3:1 and that the molar ratio of the saturated dicarboxylic acid unit containing 4 or more carbon atoms to the total amount of the terephthalic acid unit and the isophthalic acid unit is about 1/9:1 to about 1:1.

When the proportion of the saturated dicarboxylic acid group containing 4 or more carbon atoms is too large, the strength and hardness of the cured product are lowered, and it is therefore preferred for the molar ratio of the saturated dicarboxylic acid unit containing 4 or more carbon atoms to the total amount of the terephthalic acid unit and the isophthalic acid unit be about 1 or less.

Where the saturated dicarboxylic acid unit containing 4 or more carbon atoms is not used or is used in a small amount, it is preferred for those dihydric alcohols containing 3 or more carbon atoms as hereinafter described, dihydric alcohol units having large numbers of carbon atoms, such as those units resulting from long chain glycols, e.g., polyethylene glycol, polypropylene glycol and polytetramethylene glycol, to be introduced in order to provide a liquid acryloyloxy-terminated polyester which is compatible and is capable of providing a cured product with flexibility and elongation.

The hydroxy-terminated polyester as used in this invention can be prepared easily from an acid and an alcohol corresponding, respectively, to the dicarboxylic acid unit and dihydric alcohol unit constituting the skeleton thereof, using known methods heretofore used in production of conventional saturated polyesters.

The molecular weight of the hydroxy-terminated polyester is controlled in the range of about 400 to about 5,000 by controlling the amount of the dihydric alcohol reacted with the dicarboxylic acid and/or the polycondensation conditions (temperature and time).

Such hydroxy-terminated polyesters can be prepared, for example, by the following methods (i), (ii) and (iii) (see, for example, Japanese Patent Application (OPI) Nos. 92394/75 and 92395/75):

(i) A predetermined dicarboxylic acid (or a derivative thereof such as a dicarboxylic acid anhydride and a lower alkyl ester, e.g., a dicarboxylic acid dimethyl ester) and a predetermined dihydric alcohol are polycondensed by heating. The ratio of the dicarboxylic acid to the dihydric alcohol charged is determined so that n satisfies the following equation:

$$\overline{M}g \cdot n(\overline{M}a + \overline{M}g) = \text{about } 400 \sim 5{,}000$$

wherein $\overline{M}g$ and $\overline{M}a$ are the average molecular weight of the dihydric alcohol unit (—O—R—O—unit) and the average molecular weight of the dicarboxylic acid unit (—OC'R'—CO—unit), respectively.

The end point of the reaction can be determined by measuring the water (or methanol or the like) resulting from the esterification because water formation ceases at the end point of the reaction.

(ii) A low molecular weight polyester can be prepared from a dicarboxylic acid and a dihydric alcohol, and then polycondensed under reduced pressure while removing the alcohol formed.

The dihydric alcohol is usually charged in a ratio of 2 n mol per n mol of the dicarboxylic acid, and the resulting mixture is heated to form the low molecular weight polyester. The low molecular weight polyester is then polycondensed under reduced pressure while observing the alcohol formed, or measuring the molecular weight of the polyester formed using a suitable analytical method, such as liquid chromatography or titrimetric analysis, or by a combination thereof, so that the polyester formed has a predetermined molecular weight.

(iii) A high molecular weight polyester can be mixed with a predetermined amount of a dihydric alcohol and then depolymerized until it has a predetermined molecular weight. The amount of the dihydric alcohol (n mol) added per mol of the high molecular weight polyester is substantially determined by the following relation:

$$\frac{\overline{M}p + \overline{M}g}{N + 1} = \text{about } 400 \sim 5{,}000$$

wherein $\overline{M}p$ represents the average molecular weight of the high molecular weight polyester, and $\overline{M}g$ represents the average molecular weight of the dihydric alcohol.

The end point of the reaction is determined experimentally because it will vary depending on the type and amount of the catalyst used, and the reaction temperature.

In any of the above-described methods, the polycondensation or depolymerization reaction is performed, if desired, in the presence of an esterification or ester exchange catalyst. Catalysts which can be used include metal compounds, such as a zinc compound (e.g., zinc acetate), a titanium compound (e.g., tetraalkyl titanate), a magnesium compound (e.g., magnesium chloride), a manganese compound (e.g., manganese acetate), an antimony compound (e.g., antimony trioxide), and an aluminum compound (e.g., aluminum acetate), p-toluenesulfonic acid, benzenesulfonic acid, naphthalenesulfonic acid, sulfuric acid, and the like.

The amount of the catalyst used is usually from about 0.5 ppm to about 30,000 ppm and preferably from about 1 ppm to about 500 ppm although the amount varies depending on the type of the catalyst used, the reaction temperature, etc.

Where the amount of the catalyst used is too large, it is sometimes necessary to remove residual catalyst after the reaction. On the other hand, where the amount of catalyst is too small, it becomes difficult to carry out the reaction at relatively low temperatures.

The reaction temperature is usually within the range of from about 150° C. to about 250° C.

Generally, the reaction is carried out while introducing an inert gas into the reactor for the purpose of removing the water or alcohol formed, or from the standpoint of safety.

The reaction time is usually within the range of from about 3 hours to about 20 hours although the time varies depending on the type of the catalyst used and the reaction temperature.

The hydroxy-terminated polyester obtained is ordinarily a dihydroxy-terminated polyester, i.e., a polyester having a hydroxy group at the both ends and in some cases, this polyester contains a small amount of a monohydroxyterminated polyester, i.e., a polyester having a hydroxy group only at one end. In this invention, either of such polyesters can be used. Therefore, if the former dihydroxy-terminated polyester is used as a starting material, a diacryloyloxy-terminated polyester, i.e., a polyester having an acryloyloxy group at both ends thereof, is obtained, whereas if the latter dihydroxy-terminated polyester containing a small amount of monohydroxy-terminated polyester is used as a starting material, the acryloyloxy-terminated polyester obtained will contain a small amount of a monoacryloyloxy-terminated polyester, i.e., a polyester having an acryloyloxy group at one end thereof.

Starting materials for use in the production of the hydroxy-terminated polyester of this invention are described below:

Examples of starting materials which can be used to introduce the terephthalic acid unit include terephthalic acid and derivatives thereof such as the lower alkyl esters thereof (e.g., dimethyl ester, diethyl ester, etc.), the acid halides (e.g., acid chloride, acid bromide, etc.) and the amides (monoamide and diamide).

Examples of starting materials which can be used to introduce the isophthalic acid unit include isophthalic acid and derivative thereof such as the lower alkyl esters thereof (e.g., dimethyl ester, diethyl ester, etc.), the acid halides (e.g., acid chloride, acid bromide, etc.) and the amides (monoamide and diamide).

Examples of starting materials which can be used to introduce the saturated dicarboxylic acid unit containing 4 or more carbon atoms include succinic acid, glutaric acid, adipic acid sebacic acid, decanedicarboxylic acid, dodecanedicarboxylic acid, 1,4-(or 1,3 or 1,2-)cyclohexanedicarboxylic acid, etc., and derivatives thereof such as the acid anhydrides and the lower alkyl esters thereof.

Dihydric alcohols containing 3 or more carbon atoms which can be used include 1,3- (or 1,2-)propylene glycol, 1,4- (or 1,3 or 2,3-)butanediol, 1,6-hexanediol, neopentyl glycol, diethylene glycol, polyethylene glycol, dipropylene glycol, polypropylene glycol, ditetramethylene glycol, polytetramethylene glycol, polyoxyethylenated bisphenol A, polyoxypropylenated bisphenol A, 1,4-dihydroxy-2-ethylbutane, 1,8-dihydroxyoctane, 2,10-dihydroxydecane, 1,4-dihydroxycyclohexane, triethylene glycol, tetraethylene glycol, tripropylene glycol, tetrapropylene glycol, 1,4-dimethylolcyclohexane, 2,2-diethyl-propanediol-1,3, 2,2-dimethyl-propanediol-1,3 3-methyl-pentanediol-1,4, 2,2-diethyl-butanediol-1,3, 4,5-dihydroxynonane, pentamethylene glycol, heptamethylene glycol, nonamethylene glycol, decamethylene glycol, 2-ethyl-hexanediol-1,3 and the like. So long as the dihydric alcohol unit constitutes about 30 mol% or more of the total alcohol unit, ethylene glycol can be used in combination with the above-described dihydric alcohols containing 3 or more carbon atoms.

The acryloyloxy-terminated polyester of this invention can be prepared by reacting the hydroxy-terminated polyester as described above with acrylic acid to convert the hydroxy group into an acrylate. In this reaction, known techniques used in the production of conventional acryloyloxy-terminated polyesters can be employed. According to a method as described in, for example, Japanese patent publication No. 47687/76, predetermined amounts of a hydroxy-terminated polyester and acrylic acid are heated at a temperature of about 125° to 130° C. while introducing an inert gas. In order to increase the conversion in accordance with this method, however, the reaction must be performed for a long period of time. In some cases, this results in polymerization of the acryloyl group. Usually, therefore, a method is employed which comprises performing an esterification in the presence of an azeotropic dehydration solvent, an esterification catalyst, and a polymerization inhibitor at the reflux temperature of the solvent while removing the water formed by the esterification (see, for example, Japanese patent publication No. 36956/73 and A. A. Berlin et al., Polyester Acrylate, Nauka, Moscow (1967)). The reaction product is then, if desired, subjected to purification processings, such as neutralization, water washing, decoloring and filtration, and on removal of the solvent by distillation, an acryloyloxy-terminated polyester is obtained.

The hydroxy-terminated polyester and acrylic acid are charged in such a ratio that the ratio of carboxyl group to hydroxyl group equivalents is ordinarily from about 0.9 to about 1.5 and preferably is from about 1.0 to about 1.2.

Reaction solvents for azeotropic dehydration which can be used include benzene, toluene, xylene, cyclohexane, n-hexane, and isopropyl ether. The amount of the solvent used is usually within the range of from about ½ to about 5 times the weight of the hydroxy-terminated polyester.

Esterification catalysts which can be used include sulfuric acid, p-toluenesulfonic acid, benzenesulfonic acid, and naphthalenesulfonic acid. The amount of the esterification catalyst is within the range of from about 0.05% by weight to about 5% by weight, preferably from about 0.1% by weight to about 3% by weight, based on the total weight of the hydroxy-terminated polyester and acrylic acid. Where the amount of the catalyst used is too small, a longer period of time is required for the reaction. On the other hand, where the amount of the catalyst is too large, it is sometimes necessary to remove the residual catalyst after the reaction.

Polymerization inhibitors which can be used include hydroquinone, hydroquinone monomethyl ether, phenothiazine, benzoquinone, copper powder, copper salts, and the like. The amount of the polymerization inhibitor used is generally within the range of from about 10 ppm to about 1,000 ppm and preferably within the range of from about 50 ppm to about 500 ppm, based on the total weight of the hydroxy-terminated polyester and acrylic acid. Where the amount of the polymerization inhibitor used is too small, polymerization of the acryloyloxy group sometimes occurs during the course of esterification. On the other hand, where the amount of the polymerization inhibitor is too large, polymerization inhibition sometimes occurs in curing the acryloyloxy-terminated polyester.

The reaction temperature is usually within the range of from about 70° C. to about 130° C. although the temperature varies depending on the type and amount of the azeotropic dehydration solvent used.

The esterification reaction is usually performed at atmospheric pressure. However, when the azeotropic temperature is high, the esterification reaction may be carried out under reduced pressure in order to control the reaction temperature within the above-described range.

The reaction time is preferably within the range of about 10 hours or less although the time varies depending on the type and amount of the catalyst used and the reaction temperature.

The thus-obtained acryloyloxy-terminated polyester of this invention is liquid or in the form of a low melting point wax and has good compatibility with other vinyl monomers, acryloyloxy-terminated oligomers and solvents.

The acryloyloxy-terminated polyester of this invention has a very low viscosity as compared with conventional acryloyloxy-terminated polyurethanes, acryloyloxy-terminated epoxy esters, etc., having nearly the same molecular weight as the acryloyloxy-terminated polyester of this invention, which tend to have an extremely high viscosity or to be solid because of their intermolecular hydrogen bonding. The acryloyloxy-terminated polyester of this invention, therefore, can be used alone or in combination with other vinyl monomers, oligomers and, if desired, thermoplastic polymers and various additives, as a liquid material or composition of low viscosity and with good workability which is suitable for use in production of paint or ink.

The acryloyloxy-terminated polyester of this invention provides a cured product exhibiting excellent adhesion and bending characteristics to TFS and tin plate to which conventional paints and inks cannot be bonded well, as well as to surface-treated steels, which could not be attained at all with conventional paints or inks prepared using prior art acryloyloxy-terminated oligomers. The cured product has excellent physical properties such as chemical resistance, elongation, hardness, toughness, water resistance and weather resistance.

Furthermore, the production of the acryloyloxy-terminated polyester of this invention does not involve an extremely exothermic reaction as in the urethanation reaction and epoxy esterification reaction, all of the starting materials are easily available, and the reaction procedures are not difficult. Therefore, the acryloyloxy-terminated polyester of this invention can be produced easily and economically. This is one of the advantageous features of this invention.

Steel sheets which can be used in this invention include a hot-rolled steel plate, a cold-rolled steel sheet, a zinc-electrogalvanized steel sheet, a zinc-galvanized steel sheet, an alloy-plating steel sheet, etc., which may be subjected to chemical-treatment using chromic acid, phosphoric acid, etc., a tin plate (i.e., a tin-plated steel sheet), a tin-free steel sheet, and a stainless steel sheet.

In effecting the process of this invention, the steel sheet can be subjected to pre-treatment, if necessary. for such pre-treatment, various known methods can be employed. In the case of a steel sheet which has already been subjected to chemical-treatment in the course of the production thereof, only washing may be applied as the pre-treatment.

The resin composition comprising mainly the acryloyloxy-terminated polyester as used herein may be the acryloyloxy-terminated polyester alone or may contain pigments, solvents, monomers, oligomers, thermoplastic polymers, etc. in addition to the acryloyloxy-terminated polyester.

The resin composition can be coated or printed by conventional coating methods, such as curtain flow coating, roll coating, and spray coating, or by conventional printing methods, such as off-set printing, gravure off-set printing, and gravure printing.

Where volatile substances such as solvents are added to the resin composition, they are evaporated prior to the irradiation with an electron beam. For the removal of such substances, a heating furnace, an infrared ray furnace, etc., can be used.

When the resin composition of this invention is coated or printed, it is irradiated with an electron beam. For the irradiation with electron beam, any of known irradiation apparatuses, such as a high voltage DC electron gun and an electron beam-irradiation apparatus having an acceleration mechanism, can be used. The acceleration voltage of the apparatus as used herein is sufficient in the range of from about 100 to several hundred killovolts. The output current is desirably high, for example, 100 milliampere/acceleration tube or more, from the standpoint of high productivity.

A suitable irradiation amount is generally from about 0.2 to about 20 Mrad, and for example, at an irradiation amount of about 0.5 to 5 Mrad, the cured resin composition exhibits good performance, although the optimum irradiation amount varies depending on the starting materials used in the production of the acryloyloxy-terminated polyester.

In general, it is known that when the coated resin composition is cured by irradiating with an electron beam, oxygen acts as a polymerization inhibitor. Thus, in the process of this invetion, it is desirable, in many cases, to cut off substances which prohibit radical polymerization, such as oxygen. Thus, it is desirable to irradiate with an electron beam in the atmosphere of inert gas, etc. This is very significant where the surface hardness, stain resistance, chemical resistance, water resistance, weather resistance, etc., of the coated film are important, and particularly when after the acryloyloxy-terminated polyester is coated, it is exposed to the air in the course of the irradiation with an electron beam.

Inert gases which can be used include nitrogen, carbon dioxide, argon, helium, and combustion gases. The concentration of oxygen at the time of irradiation is usually controlled to about 1% or less, and preferably to about 0.1% or less.

The process of this invention is useful for use in the production of a pre-coated steel sheet, i.e., a coated or printed steel sheet before forming, wherein the resin composition is coated or printed directly on a steel sheet to form a (clear) finish layer, a primer coat, a size coat or a printed layer. If desired, another resin composition may, of course, be coated on the coated or printed resin composition of this invention before or after curing by the electron beam irradiation. In the case where another resin composition is coated on the coated or printed resin composition before curing, curing of the undercoated resin composition of this invention is not affected by oxygen present at the time of irradiation with an electron beam.

While the present invention is directed to the production of a pre-coated steel sheet, the present invention can also be applied to the production of a post-coated steel sheet.

This invention will be explained in greater detail by reference to the following examples and comparative examples.

PES-A, PES-B, PES-C and PES-D indicate the following low molecular weight hydroxy-terminated polyesters:

PES-A: Prepared by reacting 2 mol of neopentyl glycol and 1 mol of adipic acid. The reaction product on the average has the following structure:

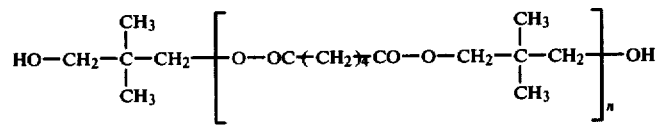

(wherein n=on the average 1.)

PES-B: Prepared by reacting 2 mol of ethylene glycol and 1 mol of adipic acid. The reaction product on the average has the following structure:

(wherein n=on the average 1.)

PES-C: Prepared by reacting 3 mol of neopentyl glycol, 1 mol of dimethyl terephthalate, and 0.5 mol of dimethyl isophthalate. The reaction product has a structure where the adipic acid unit of PES-A is replaced by terephthalic acid and isophthalic acid units (molar ration=2:1).

PES-D: Prepared by reacting 3 mol of ethylene glycol, 1 mol of dimethyl terephthalate, and 0.5 mol of dimethyl isophthalate. The reaction product has a structure where the adipic acid unit of PES-B is replaced by terephthalic acid and isophthalic acid units (molar ratio=2:1).

EXAMPLES 1 AND 2, AND COMPARATIVE EXAMPLE 1

A mixture of 100 g of dimethyl terephthalate (TP), 100 g of dimethyl isophthalate (IP), 37.6 g of adipic acid (AD), 79.9 g of ethylene glycol (EG), and 134 g of neopentyl glycol (NPG) was reacted to obtain a hydroxy-terminated polyester.

Acrylic acid was added to the above-formed hydroxy-terminated polyester so that the equivalent ratio of hydroxy group to carboxyl group (OH/COOH) was 1:1.1, and they were subjected to an esterification reaction to obtain an acryloyloxy-terminated polyester.

The thus-obtained acryloyloxy-terminated polyester was coated on a tin-free steel sheet (chromium-type tin-free steel; thickness 0.24 mm) in a thickness of about 5 microns by the use of a bar coater and then cured by irradiating with an electron beam at a dose of 2 Mrad under the conditions of a voltage of 300 KV and a current of 25 mA (scan width, 60 cm) in an atmosphere containing therein 0.1% of oxygen.

The structure and molecular weight of the hydroxy-terminated polyester are shown in Table 1, and the characteristics of the acryloyloxy-terminated polyester and the physical properties of its cured product are shown in Table 2.

In Table 1, Nos. 1, 2 and 3 have different molecular weights, because they were prepared under different conditions.

TABLE 1

Structure and Molecular Weight of Hydroxy-Terminated Polyester

| No. | Dicarboxylic Acid Unit (mol %) | | | Dihydric Alcohol Unit (mol %) | | Molecular Weight |
|---|---|---|---|---|---|---|
| | TP | IP | AD | EG | NPG | |
| 1 | 40 | 40 | 20 | 46 | 54 | 350 |
| 2 | 40 | 40 | 20 | 40 | 60 | 880 |
| 3 | 40 | 40 | 20 | 39 | 61 | 1280 |

TABLE 2

Characteristics of Acryloyloxy-Terminated Polyester and Physical Properties of Cured Product

| Example | No. of Polyester Used | Characteristics | Physical Properties of Cured Product | | | |
|---|---|---|---|---|---|---|
| | | | Pencil Hardness | Cross-Cut Test[1] | 90° (OR) Impact Bending Test[2] | DuPont Impact Test (1 Kg, 30cm) |
| Comparative Example 1 | 1 | Low viscosity liquid | 4H | 100 | C | B |
| Example 1 | 2 | Moderate viscosity liquid | 2H | 100 | A | A |
| Example 2 | 3 | Moderate viscosity liquid | 2H | 100 | A | A |

Note:
A: Good adhesion
B: Formation of cracks (whole surface)
C: Peeled apart
[1]Cross-Cut Test: Residual ratio (%) of the cured product on the steel sheet was measured when a pressure-sensitive adhesive tape was adhered to the cured product cut with a knife to make 100 squares (1 mm × 1 mm) in a 10 mm × 10 mm square and then peeled apart.
[2]90° (OR) Impact Bending Test: The steel sheet with the cured product was bent at a right angle (90°) by applying a load, and the cured product was observed at the bending position.
[3]DuPont Impact Tester was used.

From the results of Comparative Example 1, it can be seen that when the low molecular weight (350) hydroxy-terminated polyester is used, no sufficient adhesion can be obtained, which is believed to be due to its insufficient flexibility.

EXAMPLES 3 to 5

A mixture of 100 g of dimethyl terephthalate (TP), 100 g of dimethyl isophthalate (IP), 108.1 g of PES-A, 85.3 g of ethylene glycol (EG), and 71.5 g of neopentyl glycol (NPG) was reacted to obtain a hydroxy-terminated polyester. The thus-obtained hydroxy-terminated polyester was subjected to an esterification reaction to obtain an acryloyloxy-terminated polyester.

The structure and molecular weight of the hydroxy-terminated polyester are shown in Table 3.

Nos. 4 to 6 have different molecular weights, because they were prepared under different conditions.

The physical properties of the cured product were measured under the same conditions as in Examples 1 and 2. The results are shown in Table 4.

TABLE 3

Structure and Molecular Weight of Hydroxy-Terminated Polyester

| No. | Dicarboxylic Acid Unit (mol %) | | | Dihydric Alcohol Unit (mol %) | | Molecular Weight |
|---|---|---|---|---|---|---|
| | TP | IP | AD | EG | NPG | |
| 4 | 37.5 | 37.5 | 25 | 42 | 58 | 640 |
| 5 | 37.5 | 37.5 | 25 | 39 | 61 | 1360 |
| 6 | 37.5 | 37.5 | 25 | 36 | 64 | 3200 |

TABLE 4

Characteristics of Acryloyloxy-Terminated Polyester and Physical Properties of Cured Product

| Example | No. of Polyester Used | Characteristics | Pencil Hardness | Cross-Cut Test | 90° (OR) Impact Bending Test | DuPont Impact Test (1 kg, 30cm) |
|---|---|---|---|---|---|---|
| 3 | 4 | Moderate viscosity liquid | 2H | 100 | A | A |
| 4 | 5 | Moderate viscosity liquid | 2H | 100 | A | A |
| 5 | 6 | High viscosity liquid | H | 100 | A | A |

With regard to the acryloyloxy-terminated polyester of Example 5, an additional experiment was performed wherein xylene was added thereto in an amount of 20% based on the weight of polyester, because it had a high viscosity. The polyester-xylene mixture was coated on the sheet, and after evaporating the xylene by hot air at a sheet temperature of 80° C., the polyester was cured with electron beam. The results were the same as the case wherein no solvent was added.

EXAMPLES 6 to 8

A mixture of 150 g of dimethyl terephthalate, 50 g of dimethyl isophthalate, 80.2 g of PES-B, 46.9 g of ethylene glycol, and 150 g of neopentyl glycol was reacted to obtain a hydroxy-terminated polyester. The thus-obtained hydroxy-terminated polyester was subjected to an esterification reaction to obtain an acryloyloxy-terminated polyester.

The structure and molecular weight of the hydroxy-terminated polyester are shown in Table 5.

Nos. 7 to 9 have different molecular weights and structures, because they were prepared under different conditions.

The physical properties of the cured product were measured under the same conditions as in Examples 1 and 2. The results are shown in Table 6.

TABLE 5

Structure and Molecular Weight of Hydroxy-Terminated Polyester

| NO. | Dicarboxylic Acid Unit (mol %) | | | Dihydric Alcohol Unit (mol %) | | Molecular Weight |
|---|---|---|---|---|---|---|
| | TP | IP | AD | EG | NPG | |
| 7 | 56 | 19 | 25 | 36 | 64 | 400 |
| 8 | 56 | 19 | 25 | 32 | 68 | 880 |
| 9 | 56 | 19 | 25 | 30 | 70 | 1120 |

TABLE 6

Characteristics of Acryloyloxy-Terminated Polyester and Physical Properties of Cured Product

| Example | No. of Polyester Used | Characteristics | Pencil Hardness | Cross-Cut Test | 90° (OR) Impact Bending Test | DuPont Impact Test (1 Kg, 30cm) |
|---|---|---|---|---|---|---|
| 6 | 7 | Low viscosity liquid | 4H | 100 | A | A |
| 7 | 8 | Moderate viscosity liquid | 2H | 100 | A | A |
| 8 | 9 | Moderate viscosity liquid | 2H | 100 | A | A |

EXAMPLES 9 to 12

In the same manner as in Examples 1 to 5, a hydroxy-terminated polyester was prepared and subjected to an esterification reaction to obtain an acryloyloxy-terminated polyester.

The type and amount of starting material used in the production of the polyester are shown in Table 7, the structure and molecular weight of the hydroxy-terminated polyester are shown in Table 8, and the characteristics of the acryloyloxy-terminated polyester and the physical properties of the cured product are shown in Table 9.

TABLE 7

Type and Amount of Starting Material Used in Production of Hydroxy-Terminated Polyester

| No. | DMT (g) | DMI (g) | ADA (g) | PES-A (g) | EGL (g) | NpGL (g) | BDL (g) |
|---|---|---|---|---|---|---|---|
| 10 | 60 | 60 | 34.7 | — | 54.3 | 37.8 | — |
| 11 | 60 | 60 | 34.7 | — | 27.2 | 83.3 | — |
| 12 | 90 | 30 | — | 34.7 | 54.1 | 37.8 | — |
| 13 | 96.6 | 32.2 | — | 90.5 | — | 39.5 | 85.4 |

DMT: Dimethyl Terephthalate
DMI: Dimethyl Isophthalate
ADA: Adipic Acid
EGL: Ethylene Glycol
NpGL: Neopentyl Glycol
BDL: 1,4-Butanediol

TABLE 8

Structure and Molecular Weight of Hydroxy-Terminated Polyester

| No. | Dicarboxylic Acid Unit (mol %) | | | Dihydric Alcohol Unit (mol %) | | | Molecular Weight |
|---|---|---|---|---|---|---|---|
| | TP | IP | AD | EG | NPG | BD* | |
| 10 | 42.5 | 42.5 | 15 | 46 | 52 | — | 4000 |
| 11 | 42.5 | 42.5 | 15 | 19 | 81 | — | 1160 |
| 12 | 64 | 21 | 15 | 47 | 53 | — | 4800 |

TABLE 8-continued

Structure and Molecular Weight of Hydroxy-Terminated Polyester

| No. | Dicarboxylic Acid Unit (mol %) | | | Dihydric Alcohol Unit (mol %) | | | Molecular Weight |
|---|---|---|---|---|---|---|---|
| | TP | IP | AD | EG | NPG | BD* | |
| 13 | 52 | 18 | 30 | — | 40 | 60 | 920 |

*BD: 1,4-Butanediol unit

TABLE 9

Characteristics of Acryloyloxy-Terminated Polyester and Physical Properties of Cured Product

| Example | No. of Polyester Used | Characteristics | Pencil Hardness | Cross-Cut Test | 90° (OH) Impact Bending Test | DuPont Impact Test (1 Kg, 30cm) |
|---|---|---|---|---|---|---|
| 9 | 10 | High viscosity wax | 2H | 100 | A | A |
| 10 | 11 | Moderate viscosity liquid | 2H | 100 | A | A |
| 11 | 12 | High viscosity liquid | H | 100 | A | A |
| 12 | 13 | Moderate viscosity liquid | 4H | 100 | A | A |

Since the polyesters used in these examples had relatively high viscosities, xylene was added thereto in an amount of 30% based on the weight of the polyester, and the resulting xylene-polyester mixture was coated on the sheet. After evaporating the xylene by heating at a sheet temperature of 100° C., the polyester was cured by irradiating with electron beam under the same conditions as used in Examples 1 and 2.

EXAMPLES 13 TO 17

Starting materials as shown in Table 10 were polycondensed to obtain hydroxy-terminated polyesters. The structure and molecular weight of the thus-obtained hydroxy-terminated polyester are shown in Table 11. These hydroxy-terminated polyesters were subjected to an esterification reaction to obtain acryloyloxy-terminated polyesters. The characteristics of the thus-obtained acryloyloxy-terminated polyesters and the physical properties of the cured product are shown in Table 12. The physical properties of the cured product were measured under the same conditions as in Examples 1 and 2.

TABLE 10

Type and Amount of Starting Material Used in Production of Hydroxy-Terminated Polyesters

| No. | DMT (g) | DDA (g)*1 | PES-C (g) | PES-D (g) | EGL (g) | NpGL (g) | PTGL (g)*2 |
|---|---|---|---|---|---|---|---|
| 14 | 200 | 59.3 | — | — | 84 | 140.1 | — |
| 15 | — | — | 135.2 | 101.5 | — | — | 25.3 |
| 16 | — | — | 135.2 | 101.5 | — | — | 25.3 |
| 17 | — | — | 121.7 | 91.4 | — | — | 45.6 |
| 18 | — | — | 121.7 | 91.4 | — | — | 45.6 |

Note:
*1DDA: Decane Dicarboxylic Acid
*2PTGL: Polytetramethylene Glycol (molecular weight, 850)

TABLE 11

Structure and Molecular Weight of Hydroxy-Terminated Polyesters

| No. | Dicarboxylic Acid Unit (mol %) | | | Dihydric Alcohol Unit (mol %) | | | Molecular Weight |
|---|---|---|---|---|---|---|---|
| | TP | IP | DD*1 | EG | NPG | PTG*2 | |
| 14 | 80 | — | 20 | 38 | 62 | — | 1360 |
| 15 | 67 | 33 | — | 41 | 56 | 3 | 720 |
| 16 | 67 | 33 | — | 37 | 60 | 3 | 1640 |
| 17 | 67 | 33 | — | 38 | 56 | 6 | 840 |
| 18 | 67 | 33 | — | 33 | 61 | 6 | 3400 |

Note:
*1DD: Decane Dicarboxylic Acid Unit
*2PTG: Polytetramethylene Glycol Unit

TABLE 12

Characteristics of Acryloyloxy-Terminated Polyester and Physical Properties of Cured Product

| Example | No. of Polyester Used | Characteristics | Pencil Hardness | Cross-Cut Test | 90° (OR) Impact Bending Test | DuPont Impact Test (1 Kg, 30cm) |
|---|---|---|---|---|---|---|
| 13 | 14 | Moderate viscosity liquid | 2H | 100 | A | A |
| 14 | 15 | Moderate viscosity liquid | 4H | 100 | A | A |
| 15 | 16 | Moderate viscosity liquid | 3H | 100 | A | A |
| 16 | 17 | Moderate viscosity liquid | 3H | 100 | A | A |
| 17 | 18 | High viscosity liquid | H | 100 | A | A |

EXAMPLES 18 TO 20

Hydroxy-terminated polyesters, No. 5, No. 14 and No. 16, were reacted with methacrylic acid in the same manner as in Examples 1 and 2 except that the methacrylic acid was used in place of acrylic acid, to thereby obtain methacryloyloxy-terminated polyesters.

The thus-obtained methacryloyloxy-terminated polyesters were subjected to the same type of testing as used in Examples 1 and 2, and were found to have good adhesion and formability.

EXAMPLE 21 AND COMPARATIVE EXAMPLES 2 TO 6

The starting materials shown in Table 13 were reacted in an analogous manner to Examples 1 and 2 to obtain hydroxy-terminated polyesters as shown in Table 14, and the thus-obtained hydroxy-terminated polyesters were reacted with acrylic acid to produce acryloyloxy-terminated polyesters.

The characteristics of the acryloyloxy-terminated polyesters and the physical properties of the cured products obtained in the same manner as in Examples 1 and 2 are shown in Table 15.

TABLE 13

| No. | Type and Amount of Starting Material Used in Production of Hydroxy-Terminated Polyester | | | | | | |
|---|---|---|---|---|---|---|---|
| | DMT (g) | DMI (g) | ADA (g) | DDA (g) | EGL (g) | DGL (g) | NpGL (g) |
| 19 | 80 | — | — | — | — | 87.4 | — |
| 20 | 70 | — | — | 9.2 | 26.1 | — | 43.8 |
| 21 | 77.6 | 19.4 | — | — | 62 | — | — |
| 22 | — | — | 73 | — | — | — | 104 |
| 23 | 67.9 | — | 21.9 | — | 52.4 | — | 17.7 |
| 24 | 67.9 | — | 21.9 | — | — | 53 | 57 |

DMT, DMI, ADA, DDA, EGL and NpGL: See Tables 7 and 10
DGL: Diethylene Glycol

TABLE 14

| | Structure and Molecular Weight of Hydroxy-Terminated Polyester | | | | | | | |
|---|---|---|---|---|---|---|---|---|
| | Dicarboxylic Acid Unit (mol %) | | | | Dihydric Alcohol Unit (mol %) | | | Molecular |
| No. | TP | IP | AD | DD | EG | DG | NpG | Weight |
| 19 | 100 | — | — | — | — | 100 | — | 1480 |
| 20 | 90 | — | — | 10 | 36 | — | 64 | 4400 |
| 21 | 80 | 20 | — | — | 100 | — | — | 1100 |
| 22 | — | — | 100 | — | — | — | 100 | 1000 |
| 23 | 70 | — | 30 | — | 81 | — | 19 | 1230 |
| 24 | 70 | — | 30 | — | — | 38 | 62 | 940 |

TP: Terephthalic Acid Unit
IP: Isophthalic Acid Unit
AD: Adipic Acid Unit
DD: Decanedicarboxylic Acid Unit
EG: Ethylene Glycol Unit
DG: Diethylene Glycol Unit
NpG: Neopenthyl Glycol Unit

TABLE 15

Characteristics of Acryloyloxy-Terminated Polyester and Physical Properties of Cured Product

| Example | Polyester Used | Characteristics | Pencil Hardness | Cross-Cut Test | 90° (OR) Impact Bending Test | DuPont Impact Test (1 Kg, 30cm) |
|---|---|---|---|---|---|---|
| 21 | 24 | Moderate viscosity liquid | 3H | 100 | A | A |
| Comparative Example | | | | | | |
| 2 | 19 | Solid | 3H | Less than 50 | C | C |
| 3 | 20 | Solid | 2H | 50–100 | C | C |
| 4 | 21 | Solid | 3H | 50–100 | C | B |
| 5 | 22 | Low viscosity liquid | F | 50–100 | B | B |
| 6 | 23 | High viscosity liquid | 3H | 50–100 | C | B |

From the results in Table 15, it can be seen that when an acryloyloxy-terminated polyester obtained from a hydroxy-terminated polyester whose dicarboxylic acid unit does not contain 10 to 80 mol% of a terephthalic acid unit or its dihydric alcohol unit does not contain 30 mol% or more of a dihydric alcohol unit containing 3 or more carbon atoms is used, no sufficient adhesion can be obtained.

COMPARATIVE EXAMPLES 7 TO 23

To each of the acryloyloxy-terminated polyesters obtained in Examples 1 to 17 was added 2% by weight of 2,2-dimethoxy-2-phenylacetophenone as a photoinitiator to prepare seventeen compositions.

Each of these compositions was coated in a thickness of about 30 μm on a tin-free steel sheet (TFS-CT-0.24 mm). The sheet was then passed three times under a high pressure mercury lamp (ozone and focusing type) with an output of 80 W/cm at a distance of 8 cm in air at a conveyer rate of 5 m/min to irradiate the sheet with ultraviolet light and cure the composition coated thereon.

The physical properties of the thus-formed cured product were measured and are shown in Table 16.

TABLE 16

| Comparative Example | Type of Acryloyloxy-Terminated Polyester | Physical Properties | |
|---|---|---|---|
| | | Pencil Hardness | Cross-Cut Test |
| 7 | Example 1 | 2B | 100 |
| 8 | Example 2 | HB | 100 |
| 9 | Example 3 | HB | 0 |
| 10 | Example 4 | 2B | 95 |
| 11 | Example 5 | 2B | 100 |
| 12 | Example 6 | HB | 0 |
| 13 | Example 7 | 2B | 0 |
| 14 | Example 8 | 3B | 28 |
| 15 | Example 9 | 2B | 40 |
| 16 | Example 10 | 2B | 100 |
| 17 | Example 11 | F | 50 |
| 18 | Example 12 | 2B | 0 |
| 19 | Example 13 | 2B | 80 |
| 20 | Example 14 | H | 0 |
| 21 | Example 15 | 3B | 100 |
| 22 | Example 16 | 3B | 0 |
| 23 | Example 17 | 3B | 5 |

When Comparative Examples 7 to 23 are compared with Examples 1 to 17, respectively, with respect to physical properties of the cured product, it can be seen that the products cured by irradiation of ultraviolet rays are inferior in hardness to those cured by electron beam, and according to the former curing method, some of the resulting cured products (Comparative Examples 9, 12, 13, 18, 20 and 22) do not adhere to the steel sheet at all. Thus, ultraviolet ray-cured resin does not always provides a cured product having the excellent physical properties resulting from by irradiation of electron beam irradiation. In other words, a electron beam-curable resin is considered to be an improvement over an ultraviolet ray-curable resin.

COMPARATIVE EXAMPLES 24 TO 26

An acryloyloxy-terminated epoxyester (a polycondensate of a bixphenol A-diglycidyl ether type epoxy resin and acrylic acid; molecular weight: about 540), an acryloyloxy-terminated polyurethane (a polycondensate of polyethylene adipate, tolylene diisocyanate and 2-hydroxyethyl acrylate) and an acryloxyloxy-terminated polyester produced by polycondensation of phthalic acid, diethylene glycol and acrylic acid (molecular weight: about 640), each was coated without or with 2,2-dimethoxy-2-phenylacetophenone (a photoinitiator) on a tin-free steel sheet (TFS-CT-0.24 mm) and cured by irradiating with electron beam as in Examples 1 to 2 or by irradiating with ultraviolet rays as in Comparative Examples 7 to 23, respectively.

The pencil hardness of the cured product was measured and the results are shown in Table 17. Further, the cured product was subjected to a cross-cut test, 90° (OR) impact bending test and DuPont impact test as in Examples 1 to 2 and it was found that any cured product did not adhere to the steel sheet at all.

TABLE 17

Pencil Hardness of Cured Product

| Comparative Example | Type of Acryloyloxy-Terminated Compound | Pencil Hardness Electron Beam Irradiation | Pencil Hardness Ultraviolet Ray Irradiation* |
|---|---|---|---|
| 24 | Acryloyloxy-terminated Epoxyester | 3H | 3H |
| 25 | Acryloyloxy-terminated Polyurethane | 3H | 2H |
| 26 | Acryloxyloxy-terminated Polyester (Phthalic acid/Diethylene glycol/Acrylic acid) | H | H |

*The composition of the acryloyloxy-terminated compound and 2,2-dimethoxy-2-phenylacetophenone (photoinitiator) was coated and cured.

It is clearly seen from the result that, while the curing methods do not change hardness of the resulting cured product where acryloyloxy-terminated compounds other than that of the present invention are used, the cured product does not adhere to the steel sheet.

EXAMPLE 22

The same procedures as in Examples 1 to 21 were repeated, respectively, except that the acryloyloxy-terminated polyester was coated and cured on a cold-rolled steel sheet, a zinc-electrogalvanized steel sheet, a zinc-hot galvanized steel sheet, a tin plate, and a phosphate- and chromate-treated steel sheet, respectively, instead of a tin-free steel plate. The physical properties of the cured products were measured and it was found that the cured products on these steel sheets had excellent adhesion and formability, as well as on a tin-free steel sheet.

While the invention has been described in detail and with reference to specific embodiment thereof, it will be apparent to one skilled in the art that various changes and modifications can be made therein without departing from the spirit and scope thereof.

What is claimed is:

1. A process for producing a pre-coated steel sheet which comprises coating a resin composition comprising mainly an acryloyloxy- or methacryloyloxy-terminated polyester on the surface of a steel sheet, said acryloyloxy- or methacryloyloxy-terminated polyester being prepared by reacting a hydroxy-terminated polyester comprising (a) a dicarboxylic acid unit containing about 10 to about 80 mol% of a terephthalic acid unit and (b) a dihydric alcohol unit containing about 30 mol% or more of a dihydric alcohol unit containing 3 or more carbon atoms, and having a number average molecular weight of about 400 to about 5,000, with acrylic acid or methacrylic acid, and curing the thus-coated resin composition by irradiating the sheet with an electron beam.

2. The process as in claim 1, wherein the dicarboxylic acid unit (a) comprises about 10 to about 80 mol% of a terephthalic acid unit, about 10 to about 80 mol% of an isophthalic acid unit or a saturated dicarboxylic acid unit containing 4 or more carbon atoms, and 0 to about 50 mol% of another dicarboxylic acid unit.

3. The process as in claim 1, wherein the dicarboxylic acid unit (a) comprises about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit, the molar ratio of the isophthalic acid unit to the terephthalic acid unit is about 0.3:1 to about 3:1, and the molar ratio of the saturated dicarboxylic acid unit containing 4 or more carbon atoms to the total amount of the terephthalic acid unit and the isophthalic acid unit is about 1/9:1 to about 1:1.

4. The process as in claim 1, wherein the dicarboxylic acid unit (a) comprises about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit.

5. A process as in claim 1, 2, 3, or 4 wherein the acryloyloxy-terminated polyester has a viscosity of at least 100 cps.

6. A process as in claim 1, 2 or 4 wherein the acryloyloxy-terminated polyester has a viscosity of at least 500 cps.

7. The process as in claim 1, wherein the dicarboxylic acid units (a) consists essentially of about 10 to about 80 mol% of a terephthalic acid unit, about 10 to about 80 mol% of an isophthalic acid unit or a saturated dicarboxylic acid unit containing 4 or more carbon atoms, and 0 to about 50 mol% of another dicarboxylic acid unit.

8. The process as in claim 1, wherein the dicarboxylic acid unit (a) consists essentially of about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit.

9. The process as in claim 1, wherein the dicarboxylic acid unit (a) consist essentially of about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit, the molar ratio of the isophthalic acid unit to the terephthalic acid unit is about 0.3:1 to about 3:1, and the molar ratio of the saturated dicarboxylic acid unit containing 4 or more carbon atoms to the total amount of the terephthalic acid unit and the isophthalic acid unit is about 1/9:1 to about 1:1.

10. A pre-coated steel sheet produced by coating a resin composition comprising mainly an acryloyloxy- or methacryloyloxy-terminated polyester on the surface of a steel sheet, said acryloxy- or methacryloyloxy-terminated polyester being prepared by reacting a hydroxy-terminated polyester comprising (a) a dicarboxylic acid unit containing about 10 to about 80 mol% of a terephthalic acid unit and (b) a dihydric alcohol unit containing about 30 mol% or more of a dihydric alcohol unit containing 3 or more carbon atoms, and having a number average molecular weight of about 400 to about 5,000, with acrylic acid or methacrylic acid, and curing the thus-coated resin composition by irradiating the sheet with an electron beam.

11. A pre-coated steel sheet as in claim 10, wherein the dicarboxylic acid unit (a) comprises about 10 to about 80 mol% of a terephthalic acid unit, about 10 to about 80 mol% of an isophthalic acid unit and/or a saturated dicarboxylic acid unit containing 4 or more carbon atoms, and 0 to about 50 mol% of another dicarboxylic acid unit.

12. A pre-coated steel sheet as in claim 10, wherein the dicarboxylic acid unit (a) comprises about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit, the molar ratio of the isophthalic acid unit to the terephthalic acid unit is about 0.3:1 to about 3:1, and the molar ratio of the saturated dicarboxylic acid unit containing 4 or more carbon atoms to the total amount of the terephthalic acid unit and the isophthalic acid unit is about 1/9:1 to about 1:1.

13. A pre-coated steel sheet as in claim 10, wherein the dicarboxylic acid unit (a) comprises about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit.

14. A pre-coated sheet as in claim 10, 11, 12, or 13 wherein the acryloyloxy-terminated polyester has a viscosity of at least 100 cps.

15. A pre-coated sheet as in claim 10, 11, 12, or 13 wherein the acryloyloxy-terminated polyester has a viscosity of at least 500 cps.

16. A pre-coated steel sheet as in claim 10, wherein the dicarboxylic acid unit (a) consists essentially of about 10 to about 80 mol% of a terephthalic acid unit, about 10 to about 80 mol% of a terephthalic acid unit, about 10 to about 80 mol% of an isophthalic acid unit or a saturated dicarboxylic acid unit containing 4 or more carbon atoms, and 0 to about 50 mol% of another dicarboxylic acid unit.

17. A precoated steel sheet as in claim 10, wherein the dicarboxylic acid unit (a) consists essentially of about 10 to about 80 mol% of a terephthalic acid unit, about 10 to about 80 mol% of an isophthalic acid unit and a saturated dicarboxylic acid unit containing 4 or more carbon atoms, and 0 to about 50 mol% of another dicarboxylic acid unit.

18. A pre-coated steel sheet as in claim 10, wherein the dicarboxylic acid unit (a) consists essentially of about 10 to about 80 mol% of a terephthalic acid unit, about 10 to about 80 mol% of an isophthalic acid unit and a saturated dicarboxylic acid unit contining 4 or more carbon atoms, and 0 to about 50 mol% of another dicarboxylic acid unit, the molar ratio of the isophthalic acid unit to the terephthalic acid unit is about 0.3:1 to about 3:1, and the molar ratio of the saturated dicarboxylic acid unit containing 4 or more carbon atoms to the total amount of the terephthalic acid unit and the isophthalic acid unit is about 1/9:1 to about 1:1.

* * * * *